United States Patent
Siegfriedsen

(10) Patent No.: US 9,121,308 B2
(45) Date of Patent: Sep. 1, 2015

(54) WIND TURBINE HAVING A HELICOPTER LANDING PAD

(75) Inventor: Sonke Siegfriedsen, Rendsburg (DE)

(73) Assignee: Aerodyn Engineering GmbH, Rendsburg (DE)

( * ) Notice: Subject to any disclaimer, the term of this patent is extended or adjusted under 35 U.S.C. 154(b) by 514 days.

(21) Appl. No.: 13/640,155

(22) PCT Filed: Dec. 13, 2011

(86) PCT No.: PCT/DE2011/002112
§ 371 (c)(1),
(2), (4) Date: Nov. 27, 2012

(87) PCT Pub. No.: WO2012/083925
PCT Pub. Date: Jun. 28, 2012

(65) Prior Publication Data
US 2013/0202446 A1    Aug. 8, 2013

(30) Foreign Application Priority Data
Dec. 24, 2010  (DE) .......................... 10 2010 055 873

(51) Int. Cl.
| | |
|---|---|
| *F03D 11/00* | (2006.01) |
| *F01D 25/28* | (2006.01) |
| *F03D 11/04* | (2006.01) |
| *E01F 3/00* | (2006.01) |
| *F03D 1/00* | (2006.01) |
| *F03D 7/02* | (2006.01) |
| *E04H 12/08* | (2006.01) |

(52) U.S. Cl.
CPC . *F01D 25/28* (2013.01); *E01F 3/00* (2013.01); *F03D 1/003* (2013.01); *F03D 1/005* (2013.01); *F03D 7/0268* (2013.01); *F03D 11/005* (2013.01); *F03D 11/04* (2013.01); *E04H 12/08* (2013.01); *F05B 2240/912* (2013.01); *F05B 2240/95* (2013.01); *Y02E 10/723* (2013.01); *Y02E 10/728* (2013.01)

(58) Field of Classification Search
CPC ....... F03D 1/003; F03D 1/065; F03D 7/0268; F03D 11/04; F03D 11/05; E04H 12/10; E04H 12/28
USPC ..................................................... 416/244 R
See application file for complete search history.

(56) References Cited

U.S. PATENT DOCUMENTS

| | | | |
|---|---|---|---|
| 8,011,893 B2 * | 9/2011 | Stiesdal | 416/204 R |
| 2007/0110578 A1 * | 5/2007 | Stommel | 416/132 B |

FOREIGN PATENT DOCUMENTS

| | | |
|---|---|---|
| DE | 10013442 | 10/2001 |
| DE | 20205396 | 11/2002 |
| DE | 102005055585 | 5/2007 |
| DE | 102008063043 | 7/2010 |
| EP | 2343453 | 7/2011 |

* cited by examiner

*Primary Examiner* — Ninh H Nguyen
(74) *Attorney, Agent, or Firm* — Diederiks & Whitelaw, PLC

(57) ABSTRACT

A wind turbine includes a tower, a nacelle rotatably arranged on the tower, and a helicopter landing pad arranged on the nacelle. The wind turbine has a rotor having at most two rotor blades and a locking device for locking the rotor in a position in which the rotor blades extend horizontally, and the helicopter landing pad is arranged on the nacelle in such a way that the cross-section of the upper tower section lies completely within the outer contour of the helicopter landing pad in the top view.

16 Claims, 5 Drawing Sheets

WIND TURBINE HAVING A HELICOPTER LANDING PAD

CROSS-REFERENCE TO RELATED APPLICATIONS

This application represents a National Stage application of PCT/DE2011/002112 entitled "Wind Turbine Having a Helicopter Landing Pad" filed Dec. 13, 2011, pending.

BACKGROUND OF THE INVENTION

The invention relates to a wind turbine comprising a tower, a nacelle rotatably arranged on the tower, and a helicopter landing pad arranged on the nacelle.

Besides erecting wind turbines in offshore areas, it is also the maintenance of offshore wind turbines that places high demands on the safety of the personnel maintaining the offshore wind turbines and on the logistics for carrying out such tasks. The offshore areas in which wind turbines can be usefully erected are at the same time areas with wind speeds that on annual average are high, changeable weather situations and high waves and are thus areas that under extreme conditions are only hardly accessible or not accessible at all.

The necessity, that exists for economic reasons, to keep the downtimes of wind turbines as short as possible, is thus in competition with the possibility, in the maintenance or repair case of an offshore wind turbine, to reach the offshore wind turbine at all. It is in particular also the time for this that has to be taken into account due to the decentralised location of such wind turbines, which is required to reach the offshore wind turbines from the mainland. Over and above this, the repair case of a wind turbine regularly also coincides with extreme weather that permits access to the wind turbine in need of repair only during very short time windows, if at all.

Therefore several devices of an offshore wind turbine have been proposed to safely transfer personnel and material by air or by water above the water surface and also below the water surface to a plant in need of maintenance.

Despite the fact that the trip to an offshore wind turbine below the water surface by means of a submarine, as has been proposed for example in DE 10 2005 055 585 A1, is largely independent of the weather, this method is very time consuming and necessitates especially designed underwater vehicles for docking to the offshore wind turbine.

Of the two types of transport mentioned above the water surface, it is again the transport of material and/or personnel using a helicopter that is preferred since for the outward and return trips less time has to be planned compared to travel by ship. In particular in the case of rapidly changing weather, (the time for) the transport by ship can hardly be calculated.

In particular during transport by helicopter it is advantageous if the personnel can be directly set down on the nacelle of the wind turbine since there is a need for the personnel, for maintenance purposes, to climb the tower to the nacelle and thus the downtime of the plant in need of maintenance can be kept short.

For setting down the personnel from a helicopter on a wind turbine, for example upwardly open cage structures, so-called hoisting platforms, arranged for example on the nacelle of the wind turbine, are known into which the personnel can be lowered by means of a winch from a helicopter. However, this procedure of lowering personnel from a helicopter hovering above the wind turbine, demands increased attention by the pilot, the helicopter personnel operating the winch, and the maintenance personnel that is hooked in on the cable of the winch and is to be lowered on the wind turbine, which in addition must have particular qualification. In addition, this procedure is also inconvenient and not without risk for all taking part in the procedure.

As an alternative to this, helicopter landing pads have already been disclosed that are supported on the tower and/or on the nacelle of the wind turbine; see also DE 100 13 442 C1 or DE 202 05 396 U1. The advantage of helicopter landing pads arranged on the wind turbine consists in the fact that the pilot does not have to stop the helicopter above the wind turbine and that it is easy and convenient for the personnel to exit the helicopter without any additional safety risk existing for the personnel as a result of the abseiling manoeuvre. In addition, it is also possible to save on fuel since the helicopter does not have to return to its base or have to circle in the area of the wind turbine but can be parked directly on the wind turbine for the maintenance period. In the case of a technician being injured during maintenance work it is also possible for him to be transported away much more easily.

However, the disadvantage of helicopter landing pads directly arranged on the wind turbine is that the landing pads essentially have to be arranged at the level of the nacelle opposite the rotor and thus as far away possible from the hub and the rotor blades of the wind turbine so that no collision of the rotor blades of the helicopter with the rotor blades of the wind turbine occurs. Minimum distances are stipulated for this. However, this arrangement requires the design of the supporting components to be of large dimensions for introducing the weight of the helicopter landing pad and the loads arranged thereon into the tower of the wind turbine, this design again increasing the entire weight of the wind turbine, the amount of work involved during the construction of the individual components and their costs.

SUMMARY OF THE INVENTION

It is therefore the object of the invention to provide a wind turbine, in particular an offshore wind turbine, having a landing facility for helicopters, which influences the statics of the wind turbine as little as possible and exhibits a connecting structure that is as simple and light as possible.

The invention is based on an advantageous combination of several features that, only together, permit a successful implementation of the subject matter of the invention:

1. The wind turbine according to the invention has to be a wind turbine having a two-blade rotor.
    The wind turbine may only be a wind turbine having at most two rotor blades. In the case of a wind turbine having three rotor blades, there is the problem to be avoided according to the invention, that the rotor blades of the wind turbine, even in the case of a locked rotor, represents a collision risk for the helicopter, in particular for its rotor blades, since always at least one blade of the three-blade rotor extends above the top of the nacelle.
2. The wind turbine must exhibit a locking device using which the two-blade rotor can be locked in a position in which the blades of the two-blade rotor extend in a horizontal position. The locking device can for example have a design as is known from DE 10 2008 063 043 B4.
    So that the collision risk, mentioned under 1, of the rotor blades of the wind turbine with the rotor blades of the helicopter can be ruled out, it must be possible for the two-blade rotor of the inventive wind turbine to be locked in a horizontal position so that none of the blades extend above the top of the nacelle.
    A helicopter pilot flying to the inventive wind turbine will thus be presented with a straightforward approach situation without having to worry about structures that extend vertically across the landing pad.

3. Finally the cross-section of the upper tower section in plan view of the inventive wind turbine must lie completely inside the outside contour of the helicopter landing pad.

This attribute of the wind turbine ensures that the loads taken up by the helicopter landing pad as also the load of the helicopter landing pad itself can be introduced across the shortest path possible and essentially at right angles into the tower of the wind turbine. This design achieves a high degree of stability of the construction that presents a high level of safety for the landing process and for parking a helicopter on the wind turbine. Since also no booms are required for this, the construction of the helicopter landing pad can also have a light-weight and economic design.

A design of the invention is particularly preferred where the helicopter landing pad and the tower are arranged concentrically and the centre of gravity of the helicopter landing pad is arranged essentially vertically above the centre of the tower cross-section.

As is known, the helicopter landing pad is of circular design or designed in particular as a regular octagon. Preferably, it is provided with a mesh for arresting falls that surrounds the helicopter landing pad that can particularly preferably be folded at least in the area facing the rotor of the wind turbine so that the entire surface of the helicopter landing pad can be reduced in the case of non-use during the regular operation of the wind turbine and can be enlarged prior to the approach of a helicopter.

According to a further preferred exemplary embodiment, the helicopter landing pad also exhibits a passage into the interior space of the nacelle of the wind turbine. This passage can be designed for example open or having a hatch that can be locked, it being possible for the hatch to be part of the horizontally extending landing pad.

As an alternative, the design of the hatch can also be such that the hatch does not end in the interior of the nacelle but on the top of the nacelle or of a gangway arranged next to the nacelle, that is to say a walkway leading to a manhole into the interior of the nacelle or into the tower. The gangway can for example be a cooling plant arranged outside the nacelle.

In addition to the general regulations for marking the helicopter landing pad with the letter "H", illumination of the landing pad, fastening devices for fastening the helicopter while parking on the landing pad, it is also the general regulations in air traffic that have to be complied with, in particular the regulations for the approval of the installation and the operation of helicopter landing places.

BRIEF DESCRIPTION OF THE DRAWINGS

The invention is described below in more detail with reference to an exemplary embodiment of particularly preferred design that is illustrated in the attached drawings, in which.

DETAILED DESCRIPTION OF THE INVENTION

Figure 1:
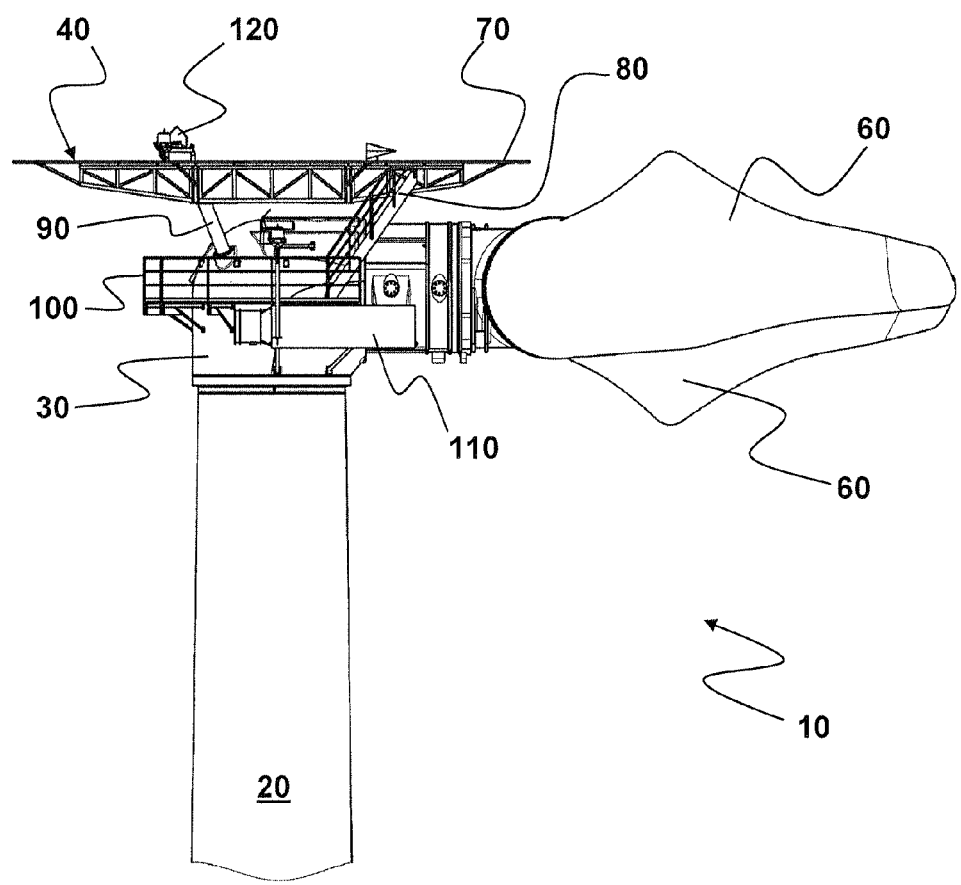
FIG. 1 shows an elevation of the wind turbine according to the invention from the side of the head carrier.

FIG. 1 shows an exemplary embodiment of particularly preferred design of a wind turbine according to the invention in an elevation. The wind turbine 10 is designed as an SCD installation and exhibits a tower 20, a head carrier 30 (that is to say a nacelle designed as a load-transmitting element), and a two-blade rotor having blades 6 that are linearly arranged on a rotor hub. Compared to the regularly used nacelles that only exhibit a casing made of plastic, using a head carrier 30 has the advantage that a cast steel casting is placed on the tower that realises a very frictional connection to the tower 20 and thus the loads of the helicopter landing pad 40 can be directly introduced vertically by means of the head carrier 30 into the tower 20.

Above the head carrier 30, a helicopter landing pad 40 is arranged, that is attached to the head carrier 30 by means of the supports 90. The helicopter landing pad 40 exhibits a passage 70 that can be fitted with a staircase so that the personnel can safely go from the helicopter landing pad 40 into the head carrier 30 of the tower 20. For the safety of the personnel that has landed on the helicopter landing pad 40, also a fall arrestor 70 that is formed by a mesh is provided on the helicopter landing pad, that is designed, at least in the area of the helicopter landing pad 40 facing the rotor such that it can be folded in and out. In particular during operation of the wind turbine, the fall arrestor 70 will be folded in so as to avoid a collision of the rotor blades 60 with the helicopter landing pad 40. In particular a control system will fold out the fall arrestor 70 in the area facing the rotor only if the rotor is locked.

In FIG. 1 it can be seen clearly that the helicopter landing pad 40 and the tower 20 of the wind turbine 10 are arranged concentrically, the centre of gravity of the helicopter landing pad 40 being arranged essentially vertically above the centre of the tower cross-section.

Below the helicopter landing pad 40, the passage 70 and the gangway 100 arranged below thereof are secured by a railing. Further elements, for example cooling plants 110, can be arranged below the gangway 100 and can preferably also form part of the gangway 100.

The helicopter landing pad 40 illustrated in FIG. 1 finally also exhibits means for navigation lights 120 and sensors for measuring the wind speed, temperature, etc.

Figure 2:
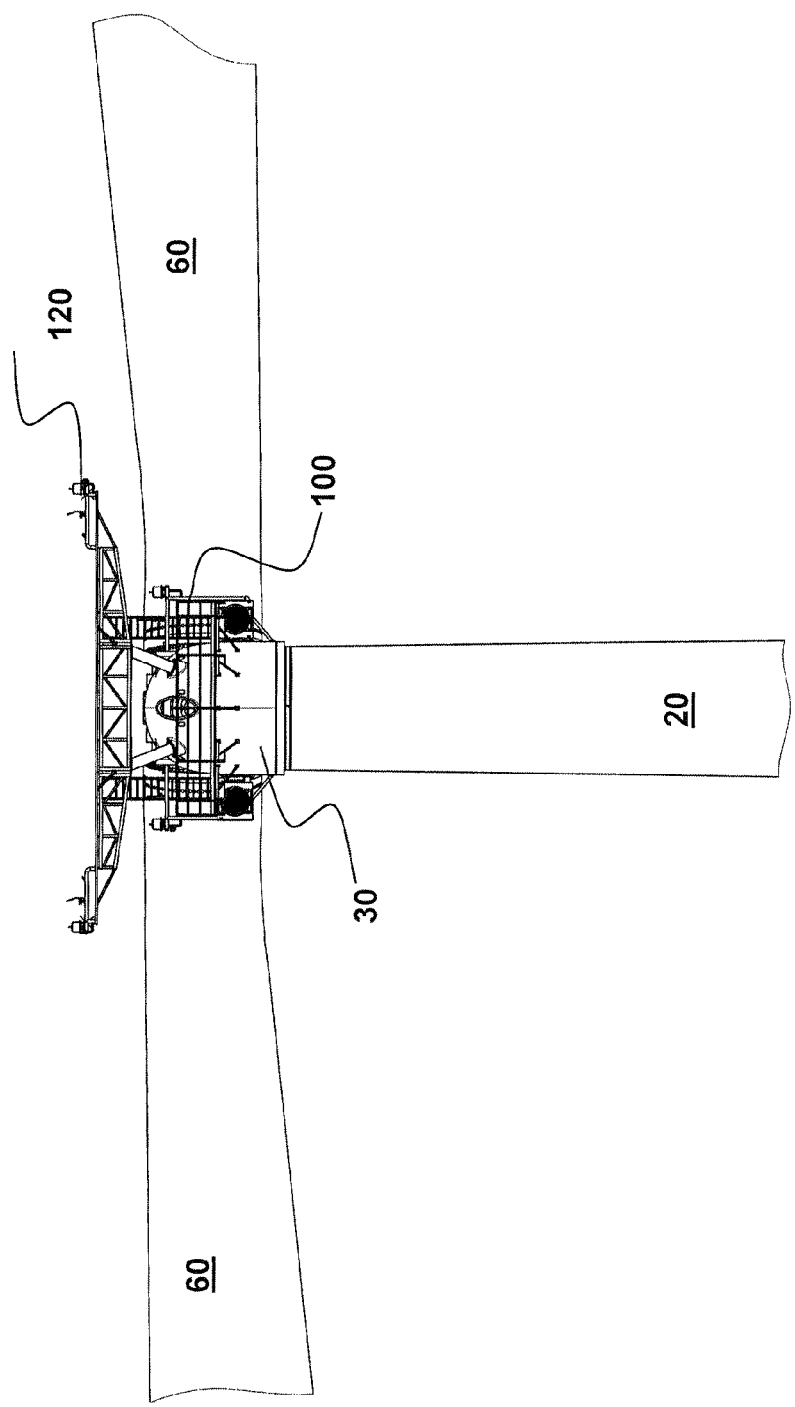
FIG. 2 shows an elevation of the wind turbine from FIG. 1 from behind.

In FIG. 2 it can be recognised that these means 120 are arranged on booms between which the fall arrestor has been extended. For folding in and out the fall arrestor 70 is therefore preferred if the booms are designed such that they can be folded in and out or retracted and extended. For safety reasons, the gangway 100 is designed such that it interconnects these two sides of the head carrier 30 on the side opposite the rotor, it also being possible for the passage into the head carrier 30 to take place from the side facing away from the rotor.

Figure 3:
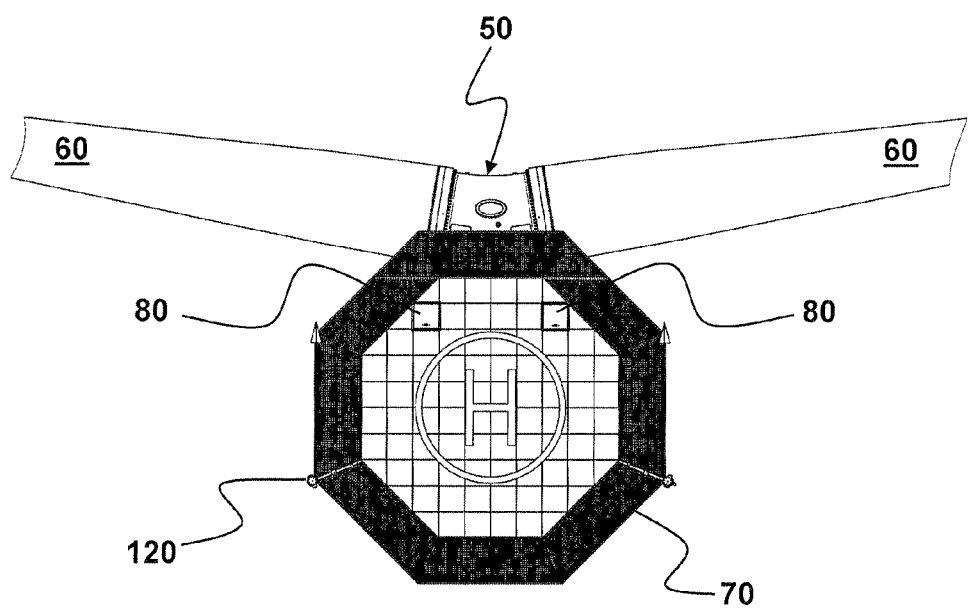
FIG. 3 shows a plan view of the wind turbine from FIG. 1.

FIG. 3 shows the wind turbine 10 of particularly preferred design from above, so that the tower cross-section is hidden by the helicopter landing pad 40. The cross-section of the upper tower section here lies in particular completely inside the outside contour of the helicopter landing pad 40, in particular inside the outside contour of the supporting part of the helicopter landing pad 40, that is to say without fall arrestor 70.

In addition to the fall arrestor 70 of foldable design, the passages 80 to the gangway can be seen on both sides of the head carrier 30. The passages 80 can be open or covered by a lid arranged in the helicopter landing pad 40 and correspondingly marked as a passage 80.

On top of this it can also be seen that in the example shown, a foldable or a retractable and extendible fall arrestor 70 is mandatory since the fall arrestor 70, in its folded-out or extended state, projects into the blade plane of the rotor 50. If the fall arrestor 70 is folded in or retracted, the rotor 50 can be released.

Figure 4:
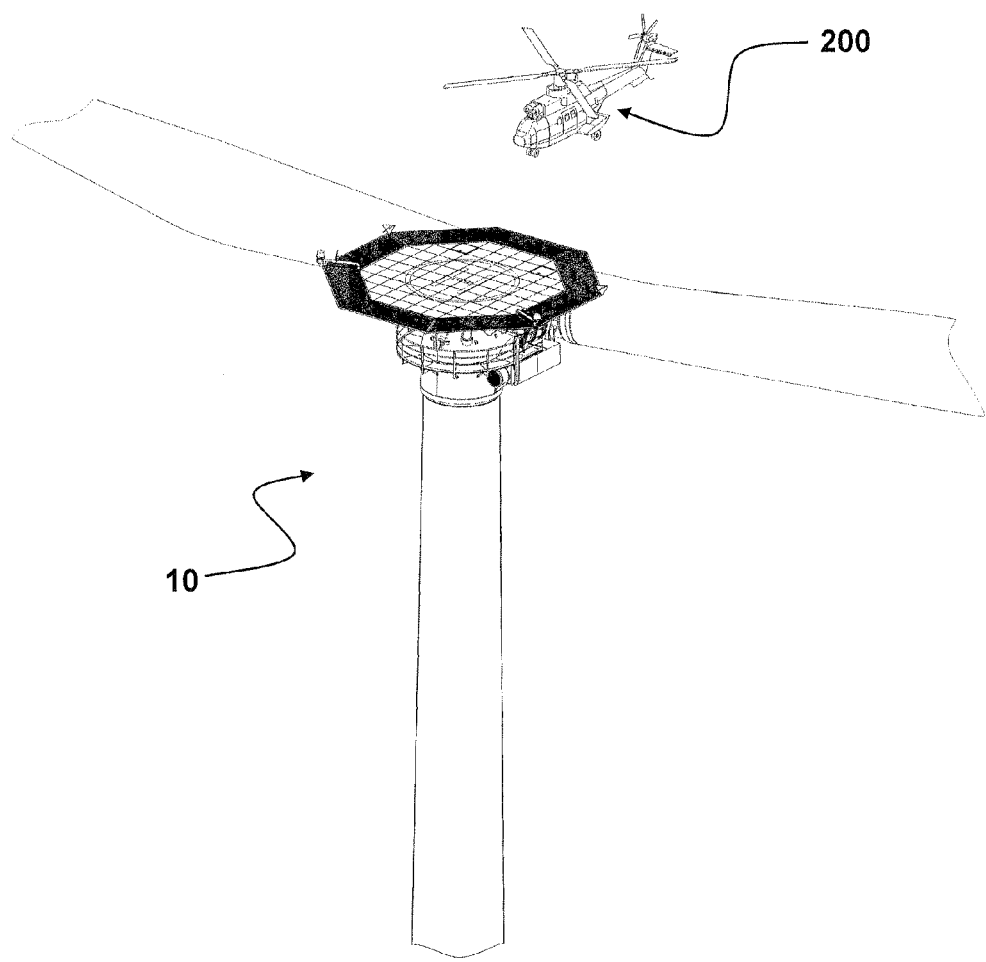
FIG. 4 shows a perspective view of the inventive wind turbine during an approach of a helicopter to the wind turbine and FIG. 5 shows a perspective view of the wind turbine from FIG. 4 with the helicopter landed on the helicopter landing pad.

FIG. 4 shows a helicopter 200 during the landing approach to a wind turbine 10 of inventive design. The approach to the wind turbine 10 using the helicopter 200 takes place counter to the direction of the wind so that the pilot of the helicopter, even if the wind turbine 10 has already been switched off, receives an optical indication as a result of the alignment of the head carrier 30 with the wind, how the wind turbine 10 is to be approached. Here switching off the installation can have been initiated in advance by a central switching point or by radio from within the helicopter 200.

In particular when switching off the installation, the rotor 50 is moved into a parking position in which the blades 60 are aligned horizontally. Then the rotor 50 is locked in the horizontal parking position by the locking device and the fall arrestor 70 is folded out or extended. It is only then that as a result of a corresponding feedback by the switching centre or on the remote control or by the navigation lights of the helicopter landing pad 40 being turned on, that the helicopter 200 can land on the helicopter landing pad 40.

Figure 5:
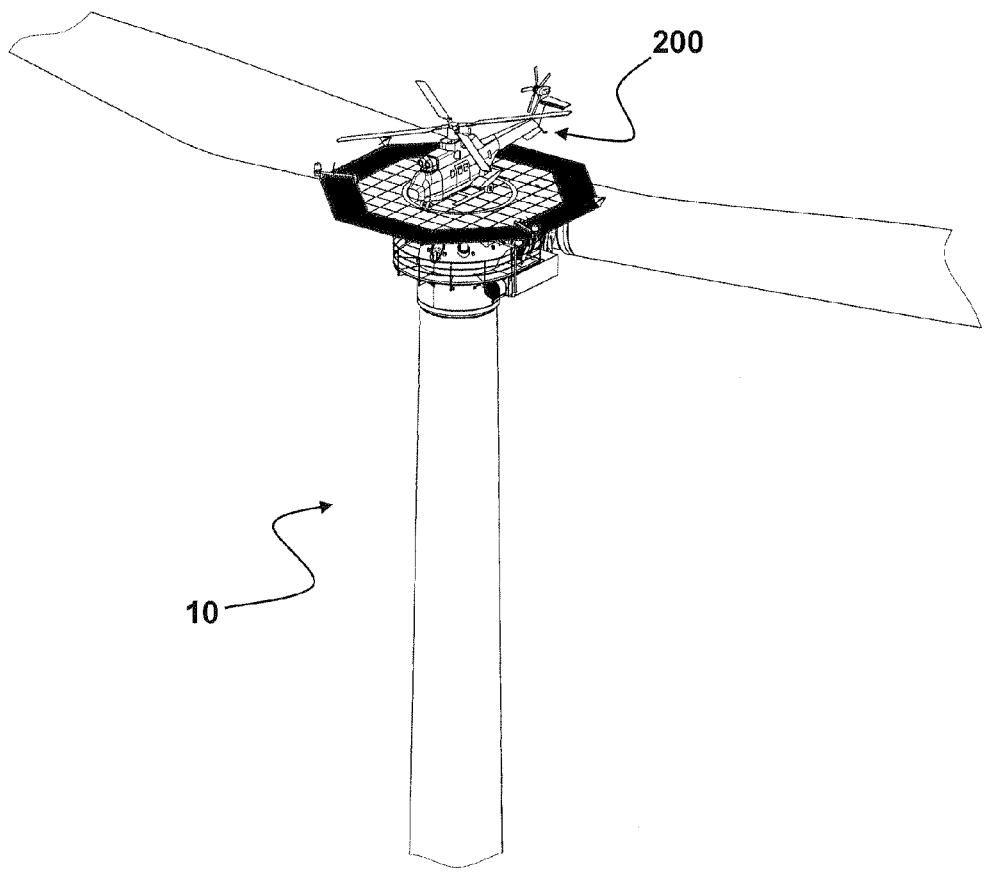

FIG. 5 shows a perspective view of the helicopter 200 that has landed on the helicopter landing pad 40. It is appreciated that the helicopter landing pad 40 has to exhibit further means for fastening the helicopter 200, so that safe parking of the helicopter 200 on the wind turbine 10 can be ensured.

The invention claimed is:

1. A wind turbine, comprising a tower, a nacelle rotatably arranged on the tower, and a helicopter landing pad arranged on the nacelle,
   characterized in that
   the wind turbine has
   a rotor having at most two rotor blades and
   a locking device for locking the rotor in a position in which the rotor blades extend horizontally, and
   that the helicopter landing pad is arranged on the nacelle in such a way that the cross-section of the upper tower section lies completely within the outer contour of the helicopter landing pad in the top view.

2. The wind turbine according to claim 1, characterized in that the centre of gravity of the helicopter landing pad is arranged essentially vertically above the centre of the tower cross-section.

3. The wind turbine according to claim 2, characterized in that the helicopter landing pad and the tower are arranged concentrically.

4. The wind turbine according to claim 2, characterized in that the helicopter landing pad is surrounded by at least one mesh, for arresting falls, that can be pivoted at least in a part area.

5. The wind turbine according to claim 2, characterized in that the helicopter landing pad exhibits a passage to the nacelle or into the tower.

6. The wind turbine according to claim 2, characterized in that the load-introducing points of the helicopter landing pad are provided on the nacelle designed as a head carrier, of the wind turbine.

7. The wind turbine according to claim 1, characterized in that the helicopter landing pad and the tower are arranged concentrically.

8. The wind turbine according to claim 7, characterized in that the helicopter landing pad is surrounded by at least one mesh, for arresting falls, that can be pivoted at least in a part area.

9. The wind turbine according to claim 7, characterized in that the helicopter landing pad exhibits a passage to the nacelle or into the tower.

10. The wind turbine according to claim 7, characterized in that the load-introducing points of the helicopter landing pad are provided on the nacelle designed as a head carrier, of the wind turbine.

11. The wind turbine according to claim 1, characterized in that the helicopter landing pad is surrounded by at least one mesh, for arresting falls, that can be pivoted at least in a part area.

12. The wind turbine according to claim 11, characterized in that the helicopter landing pad exhibits a passage to the nacelle or into the tower.

13. The wind turbine according to claim 11, characterized in that the load-introducing points of the helicopter landing pad are provided on the nacelle designed as a head carrier, of the wind turbine.

14. The wind turbine according to claim 1, characterized in that the helicopter landing pad exhibits a passage to the nacelle or into the tower.

15. The wind turbine according to claim 14, characterized in that the load-introducing points of the helicopter landing pad are provided on the nacelle designed as a head carrier, of the wind turbine.

16. The wind turbine according to claim 1, characterized in that the load-introducing points of the helicopter landing pad are provided on the nacelle designed as a head carrier, of the wind turbine.

* * * * *